United States Patent [19]

Anfinsen et al.

[11] Patent Number: 5,682,230

[45] Date of Patent: Oct. 28, 1997

[54] TEST RANGE FOR DETERMINING THE AERODYNAMIC CHARACTERISTICS OF A BALL IN FLIGHT

[75] Inventors: Leonard F. Anfinsen, Long Valley, N.J.; Burton B. Lieberman, New York, N.Y.; Alexander J. Smits, Princeton, N.J.; Bernard C. Soriano, Bridgewater, N.J.; Frank W. Thomas, Chester, N.J.; Henry Thumm-Borst, Morristown, N.J.; Robert A. Tygar, Budd Lake, N.J.; Stanley E. Chrapowicki, Neshanic Station, N.J.; Mark Zagarola, Belle Mead, N.J.

[73] Assignee: United States Golf Association, Far Hills, N.J.

[21] Appl. No.: 548,311

[22] Filed: Nov. 1, 1995

[51] Int. Cl.[6] .................. G01P 3/36; G01C 3/08; A63B 69/36

[52] U.S. Cl. .................. 356/28; 356/4.01; 473/131; 473/152; 473/190; 473/219

[58] Field of Search .................. 356/28; 473/131, 473/190, 219, 152

[56] References Cited

U.S. PATENT DOCUMENTS

| | | |
|---|---|---|
| 3,759,528 | 9/1973 | Christophers et al. |
| 4,770,527 | 9/1988 | Park ............ 356/28 |
| 5,024,441 | 6/1991 | Rousseau . |
| 5,171,013 | 12/1992 | Dooley . |
| 5,437,457 | 8/1995 | Curchod . |
| 5,481,355 | 1/1996 | Iijima et al. ............ 356/28 |
| 5,568,250 | 10/1996 | Nishiyama et al. ............ 356/28 |

*Primary Examiner*—Stephen C. Buczinski
*Attorney, Agent, or Firm*—McAulay Fisher Nissen Goldberg & Kiel, LLP

[57] ABSTRACT

The test range is provided with a calibration system for calibrating the exact position of a light curtain formed by a ballistic screen. The calibration system uses a model ball which can be moved through a light screen at high speed in order to simulate the actual passage of a driven golf ball through the light screen. Positioning of the model golf ball at a point at which the golf ball just contacts the light screen serves to determine the exact location of the light screen. A laser ranging device is used to locate the calibration system relative to a launch point. Thus, the precise distance of the curtain of light from the launch point can be readily determined. The calibration system may also be used to determine if a ballistic screen is mounted in a true vertical plane.

20 Claims, 2 Drawing Sheets

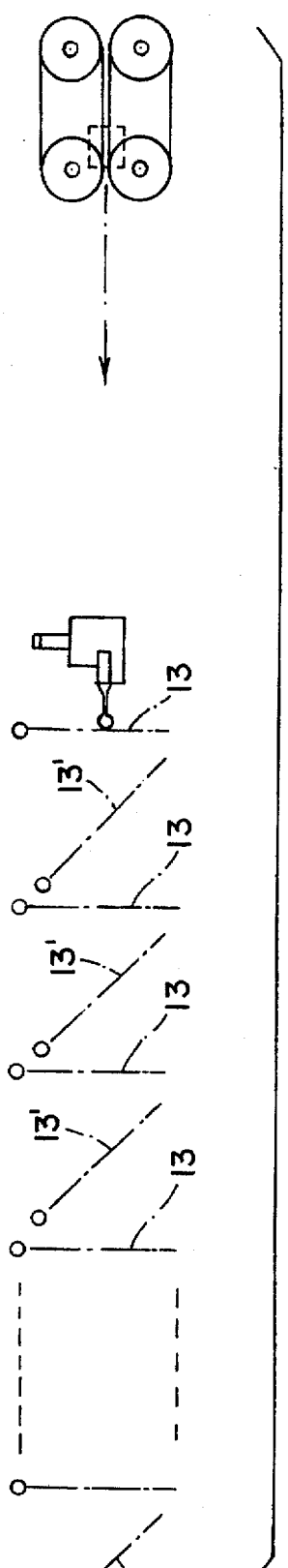
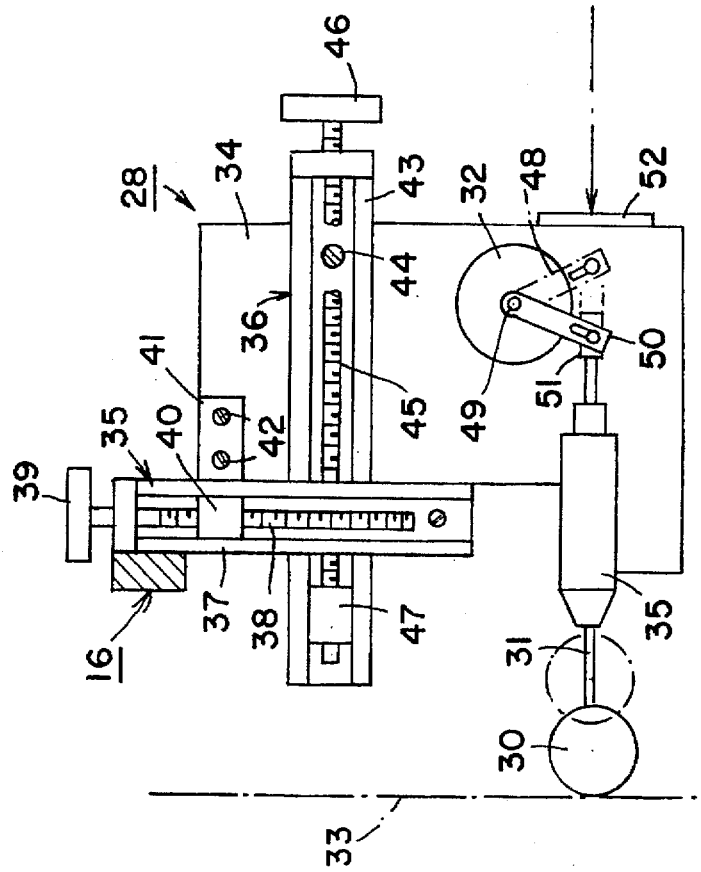
FIG. 2
FIG. 3

TEST RANGE FOR DETERMINING THE AERODYNAMIC CHARACTERISTICS OF A BALL IN FLIGHT

This invention relates to a test range for determining the aerodynamic characters of a ball in flight and particularly a golf ball.

As is known, various types of devices have been used to obtain measurements for determining the aerodynamic characteristics of a ball, for example a golf ball, in flight. In some cases, a series of golf balls have been driven by a mechanical means through a path which is monitored by various types of devices to determine the speed of the ball, the lift of the ball or the drag on the ball. For example, cameras have been positioned along the path of the ball in order to record an image of the ball in flight as well as to determine the time at which the ball passes by the camera. By determining the differences in the times at which the ball passes by two consecutive cameras and knowing the distance between the two cameras, the velocity of the ball passing by these two cameras can be mathematically determined. By comparing the images recorded by the cameras, the lift and the spin of the ball between the cameras can be determined.

Other types of devices have also been employed for determining the aerodynamic characteristics of the golf ball. For example, balls have been placed in wind tunnels on a stationary mount with streams of air directed over the ball in order to measure properties, such as drag.

However, these types of devices have been rather cumbersome and, unless precisely calibrated, have not provided extremely accurate results.

More recently, techniques have been known in which a golf ball may be driven through a series of ballistic screens in order to determine the velocity, spin, lift, drag and the like characteristics of the ball. Typically, a ballistic screen is constructed of a frame having means for forming a curtain of light through which the ball can be propelled. The ballistic screen is of a nature that only the passage of a ball at high speed will trigger the ballistic screen to emit a pulse corresponding to passage of the ball through the curtain of light. By knowing the distance between two consecutive ballistic screens, as well as the time a pulse is emitted by each screen in response to passage of a ball, the velocity of the ball and the rate of change of velocity of the ball may be calculated. However, one problem associated with this type of structure is determining the exact position of the curtain of light which is formed within a ballistics screen. Thus, a small error in the determination of the location of a light curtain of a ballistic screen may introduce a large error in the determination of the velocity of the high speed ball, and especially in the rate of change of velocity of the ball.

Accordingly, it is an object of this invention to provide a test range for accurately determining the aerodynamic characteristics of a ball in flight.

Accordingly, it is an object of the invention to be able to precisely locate a ballistic screen within a test range for determining the aerodynamic characteristics of a ball in flight.

It is another object of the invention to be able to precisely locate a curtain of light formed by a ballistic screen relative to an initial start position.

Briefly, the invention is directed to a test range for determining the aerodynamic characteristics of a ball, such as a golf ball, in flight. In this respect, the test range includes a frame which defines an elongated path, a launch means at one end of the frame for propelling a ball into and through the path and a plurality of vertically disposed and diagonally disposed ballistic screens adjustably mounted on the frame along the path for the ball. Each ballistic screen, as is known, is provided with means for forming a curtain of light across the path for passage of a propelled ball therethrough as well as sensing means for emitting a pulse in response to passage of a propelled ball therethrough at high speed.

In accordance with the invention, a calibration system is mounted on the frame for establishing an exact position of the curtain of light of each ballistic screen in the path. In addition, the invention provides a ranging device adjacent the launch means for measuring the distance from the launch means to the calibration system as a measure of the distance of each curtain of light relative to the launch means.

The calibration system is constructed so as to calibrate the position of a curtain of light to one-thousandths of a foot (0.001 foot) or one millimeter.

The calibration means is constructed with a model ball for simulating a golf ball, a shaft mounting the model ball thereon and means for moving the shaft at high speed in order to propel the model ball through a curtain of light. In this respect, the shaft is driven at such a speed that the model ball simulates the actual flight of a ball through the curtain of light of a ballistic screen.

The calibration system also includes a mounting plate which mounts the shaft thereon and which, in turn, is mounted on the frame of the test range, a horizontally adjustable means for moving the mounting plate horizontally relative to the frame and a vertically adjustable means for moving the mounting plate vertically relative to the frame. Further, the calibration is constructed so as to be moved from place to place along the length of the frame so as to calibrate the position of a curtain of light of each ballistic screen which is located along the length of the frame of the test range.

In use, the calibration system is mounted on the frame of the test range at a location adjacent a vertically or diagonally disposed ballistic screen. Thereafter, the calibration system is actuated so that the shaft on which the ball is mounted is cause to move at high speed through the curtain of light established by the ballistic screen. If the ball does not enter far enough into the plane of the curtain of light, no pulse will be emitted. The shaft is then retracted and the horizontally adjustable means of the calibration system is actuated so as to move the mounting plate closer to the curtain of light. The ball is then driven forwardly a second time. If the curtain of light is not pierced to a sufficient depth and no pulse is triggered by the ballistic screen, these steps are repeated until the ball does trigger the ballistic screen to emit a signal indicative of passage of the ball through the curtain of light. Back and forth adjustments are then made in the mounting plate until a position is reached at which the excursion of the model ball is such that the model ball just penetrates the light curtain sufficiently so that the sensing means of the screen triggers a pulse.

In accordance with the invention, the distance between a fixed point on the calibration system to the farthest excursion of the ball is known, i.e. a fixed quantity. Thus, after the calibration system has been located relative to the light screen, the distance from a point on the calibration system, such as a point at the rear of the mounting plate, to the ballistic screen is known. The ranging device, for example, a laser ranging device of known construction, may then be actuated so as to determine the distance from the ranging device to the point at the rear of the mounting plate of the calibration means. This distance would then be added to the distance from the rear point on the mounting plate to the curtain of light so as to determine the distance from the ranging device, i.e. the launch means, to the curtain of light.

Thereafter, the calibration system is moved to the next adjacent ballistic screen to carry out the same or similar steps to determine the position of the light screen of that ballistic screen relative to the launch means. In this way, the position of each light screen along the path of the flight of the ball relative to the launch means can be accurately determined, that is, to 0.001 foot (or one millimeter).

The calibration system may also be moved vertically along the height of a ballistic screen in order to determine the angle of inclination of the ballistic screen. Similar measurements would be taken using the ranging device so as to measure the distance from the ranging device to various vertically spaced points on the ballistic screen. Spanwise measurements can also be made. For the vertical ballistic screens, if the ballistic screen is not truly perpendicular to the axis of the test range, adjustments can be made to bring the ballistic screen into a truly perpendicular position. Alternatively, the ballistic screen may left in a slightly skewed position with the known position of the screen taken into account. For diagonal ballistic screens, the angle of the screen is determined from distance measurements taken at a number of vertical locations. By taking spanwise measurements, a screen can be adjusted to eliminate skewing or calibrated to determine its orientation.

Once the ballistic screens have been precisely located, and, thus the light screens of each, testing of the aerodynamic characteristics of a golf ball or other ball may then be carried out in a conventional manner.

These and other objects and advantages of the invention will become more apparent from the following detailed and description taken in conjunction with the accompanying drawings wherein:

FIG. 2 illustrates a schematic side view of the test range of FIG. 1; and

FIG. 3 illustrates a side view of a calibration system constructed in accordance with the invention.

Figure 1:
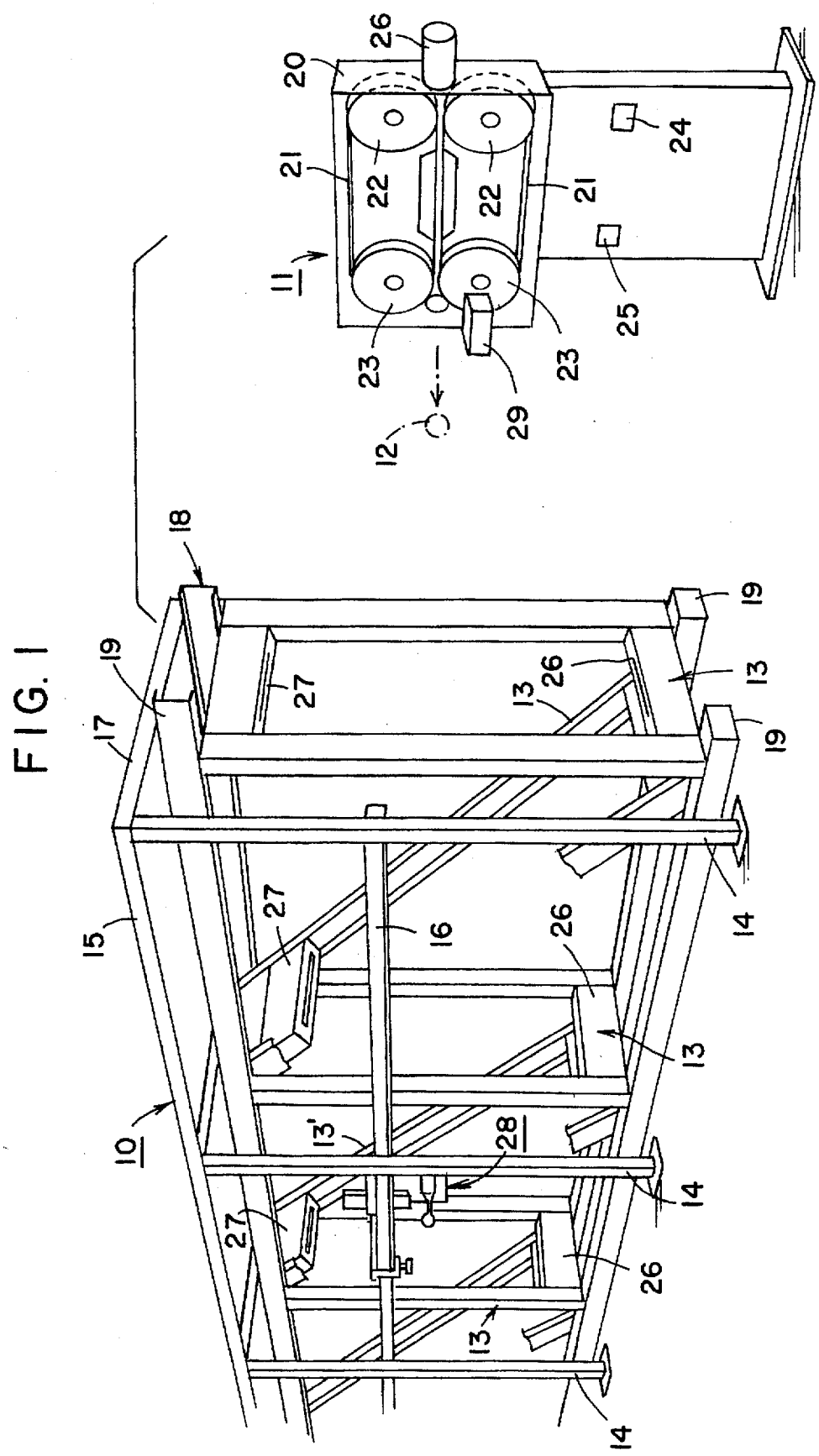
FIG. 1 illustrates a perspective view of a test range constructed in accordance with the invention.

Referring to FIG. 1, the test range for determining the aerodynamic characteristics of a golf ball in flight includes a frame 10 of skeletal construction which defines an elongated path, a launch means 11 spaced from one end of the frame 10 for propelling a golf ball 12 into and through the path defined by the frame 10 and pairs of spaced apart ballistic screens 13 which are adjustably mounted on the frame 10 longitudinally of the path defined by the frame 10.

As indicated in FIG. 1, the frame 10 is of rigid skeletal structure to define a path therethrough, for example, a path sixty-five feet long by thirty inches in height and eighteen inches in width. The frame 10 includes vertical columns 14, longitudinal cross pieces 15 secured to the tops of the columns 14, intermediate cross pieces 16 secured to intermediate points of the vertical columns 14 and transverse cross pieces 17 provided across the top of the frame 10.

The frame 10 also carries an internal frame 18 on which the ballistics screens 13 are mounted. In this respect, the main frame 10 provides rigidity and stiffness while the interior frame 18 serves to receive the ballistic screens 13 thereon in a longitudinally adjustable manner. In this respect, any suitable mounting arrangement may be used to mount each ballistic screen 13 in place on the internal frame 18.

Basically, the internal frame 18 is composed of pairs of rails 19 at the bottom and at the top which are interconnected by suitable vertical studs (not shown).

The launch means 11 includes a frame 20 on which a pair of endless belts 21 are mounted over pairs of rollers 22, 23 in order to launch a ball 12 into the path defined by the main frame 10. Such a launch means 11 is of conventional structure. In this respect, one roller 23 of each pair of rollers is driven so that the endless belts 21 thereabout can be driven at a programmed speeds.

As indicated, the endless belts 21 define an elongated longitudinally disposed passage and are spaced apart along this passage a distance sufficient to engage a golf ball in the passage on opposite sides. A means, such as a motor 24, is provided for driving the rollers 23, for example at the same speed to launch the golf ball 12. In addition, an adjustable transmission may be provided between the motor 24 and one of the rollers 23 in order to drive the rollers 23, and thus the belts 21, at different speeds so as to impart a predetermined spin on the golf ball 12 at launch.

As indicated in FIG. 1, the launch means 11 includes a means 25 for moving the endless belts 21 simultaneously relative to a horizontal plane in order to adjust the angle of inclination of a golf ball launched from between the belts 21. In this respect, the means 25 may be in the form of a motor which elevates the downstream rollers 23 of each pair of rollers 22, 23 simultaneously.

The launch means 11 is also provided with an entry tube 26 through which a ball 12 may be inserted between the endless belts 21. In this respect, the entry tube 26 may be part of a trigger mechanism (not shown) by means of which a golf ball may be positioned and then ejected into the space between the belts 21. In this regard, the ball may be provided with suitable identification marks to indicate the position of the ball in the trigger mechanism.

In use, the launch means 11 moves the ball 12 between the endless belts 21 during rotation of the rollers 22, 23 so that the ball 12 is propelled into the path defined by the frame 10. In this respect, the speed of the belts can be controlled so that the velocity of the ball 12 leaving the launch means can be accurately determined. Typically, the velocity of a ball launch by the launch means 11 is in the range of from 100 to 250 feet per second, for example to simulate the speed of a ball driven by a golf club. In addition, the endless belts 21 of the launch means 11 are operated at a differential speed so as to impart a spin on the propelled ball at a rate of from 0 to 75 revolutions per second. In addition, the belts 21 of the launch means 11 can be oriented so as to propel the ball at an inclination of 1 degree or more relative to a horizontal plane.

Referring to FIG. 2, the ballistic screens 13 are arranged vertically with an inclined ballistic screen 13' between each pair of vertically oriented screens 13. In this respect, the vertical ballistic screens 13 serve primarily to determine the velocity of a ball passing thereby while the inclined ballistic screens 13 are primarily used to determine the lift of the ball passing through.

Referring to FIG. 1, each ballistic screen 13, 13' is constructed in the same fashion. Hence, only one screen need by further described. Also, since the ballistic screens 13, 13' are of a known construction, only the more essential details will be described hereinafter.

Each ballistic screen 13 is constructed as a rectangular frame which is adjustably mounted on the internal frame 18 and includes means 26 for forming a curtain of light transversely of the passage of the propelled golf ball and sensing means 27 for emitting a pulse in response to passage of a propelled golf ball through the curtain of light at high speed.

The means 26 for forming the curtain of light includes a plurality of light emitting devices (not shown) for establishing a curtain of light within the frame of the screen 13 and perpendicular to the path through which the launched golf ball is to pass. The sensing means 27 includes a plurality of detectors (not shown), each of which is disposed opposite a light emitting device in order to receive emitted light therefrom. Each detector functions to emit a pulse in response to an interruption of emitted light thereon (i.e. the appearance of a shadow) for a preset time as an indication of the passage of a high speed golf ball through the light curtain. In this regard, the detector is programmed so that if a shadow appears thereon for longer than a preset time, e.g. due to a slow passage of a ball through the light curtain, a pulse is not emitted.

A suitable means (not shown) is connected to the detectors of each ballistic screen 13 to receive the emitted pulses therefrom and to determine the velocity of the golf ball in passing between two consecutive screens based upon the distances between the curtains of light of the screens and the time intervals between the pulses.

As indicated in FIGS. 1 and 2, the inclined ballistic screens 13' establish an angularly disposed light curtain for passage of a launched ball therethrough. As above, each angularly disposed ballistic screen 13' has light emitting devices to establish a curtain of light and detectors to sense the passage of a golf ball through the angularly disposed light curtain as an indication of the height of the golf ball.

As indicated in FIG. 1, a calibration system 28 is mounted on the main frame 10 for establishing an exact position of a curtain of light of a ballistic screen relative to a point on the calibration system 28. This calibration system 28 cooperates with a ranging device 29 mounted on the launch means 11 for measuring the distance from the launch means 11 to the predetermined point on the calibration system 28 as a measure of the distance of the light curtain of a ballistic screen from the launch means 11.

Referring to FIG. 3, the calibration system 28 includes a model ball 30, a shaft 31 mounting the model ball 30 thereon and means 32 for moving the shaft 31 at high speed in order to propel the model ball 30 through a curtain of light 33 of a ballistic screen (not shown).

The calibration system 28 also includes a mounting plate 34 which carries a housing 35 which, in turn, slidably receives the shaft 31 on which the model ball 30 is mounted.

The mounting plate 34 is mounted on an intermediate cross piece 16 of the main frame 10 via a vertically adjustable means 35 for moving the mounting plate 34 vertically relative to the frame 10 as well as a horizontally adjustable means 36 for moving the mounting plate 34 horizontally relative to the frame 10.

As indicated, the vertically adjustable means 36 includes a mounting block 37 which can be secured to the intermediate piece 16 of the main frame 10 by any suitable type of releasable locking connection (not shown). In addition, the mounting block 37 has a lead screw 38 rotatably mounted therein. This lead screw 38 carries a knob 39 at one exposed end to permit manual turning of the lead screw 38. In addition, a movable nut 40 is threaded onto the lead screw 38 and forms part of a bracket 41 which is secured to the mounting plate 34 as by a pair of screws or bolts 42. Thus, upon manual turning of the lead screw 38, the nut 40 and, thus, the mounting plate 34 may be raised or lowered vertically.

In similar fashion, the horizontally adjustable means 36 includes a mounting block 43 which is secured as by one or more screws 44 to the mounting plate 34, a lead screw 45 which is rotatably mounted in the block 43, a knob 46 which is mounted on an exposed end of the lead screw 45 and a movable nut 47 threaded onto the lead screw 45. The nut 47 is fixably secured within the block 43 so that upon rotation of the lead screw 45, the mounting plate 34 moves horizontally, left or right, as viewed.

Alternatively, the calibration system 28 may be mounted for three degrees of motion. In this case, the entire calibration system 28 is mounted on a horizontal slide which allows the assembly to move in a spanwise direction, so that the screens can be calibrated at any spanwise and vertical location.

Referring to FIG. 3, the means 32 for moving the shaft 31 at high speed includes a rotary solenoid which is electrically energized to rotate a lever 48 which is secured to a shaft 49 of the solenoid. As indicated, the lever 48 is bifurcated at one end to receive a pin 50 which is fixedly secured to a link 51 which is articulated to a proximal end of the shaft 31. Thus, as the lever 48 rotates, in a clockwise manner, about the shaft 49, the articulated linkage formed by the lever 48 and the link 51 causes the shaft 31 to move in a rectilinear manner.

The speed of rotation of the shaft 49 of the rotary solenoid 32 is sufficient to move the model golf ball 30 at a relatively high speed from a retracted position shown in dotted line in FIG. 3 to a fully extended position shown in FIG. 3.

Referring to FIGS. 1 and 3, the ranging device 29 is a conventional structure, for example, a laser ranging device for measuring the distance from the launch means 11 to a predetermined point, for example a point defined on a plate 52 secured to the back of the mounting plate 34 of the calibration system 28. As indicated in FIG. 3, the plate 52 is aligned in the same horizontal plane as the model ball 30. However, the relative positions of the plate 52 on the ball 30 may be otherwise.

In use, the calibration system 28 is mounted on the main frame 10 adjacent to the position of a ballistic screen 13. The rotary solenoid 32 is then actuated so that the model ball 30 is rapidly moved into the extended position indicated in solid line in FIG. 3. If the ball passes a sufficient distance into a light curtain 33 defined by the ballistic screen, a pulse is emitted by the detector to indicate the passage of the model ball 30 through the light curtain 33. If the model ball 30 does not pass far enough through the curtain of light 33 no pulse is emitted.

After the model ball has been first propelled forwardly and a reading taken as to whether or not the curtain of light 33 has been penetrated far enough to trigger the sensor, the mounting plate 34 is moved horizontally towards or away from the curtain of light 33 and the model ball again moved. These steps are repeated until the model ball just penetrates a sufficient distance into the light curtain 33 to trigger the detector to emit a signal. In this position, the distance of the light curtain 33 from the predetermined point on the plate 52 on the mounting plate 34 is exactly known, for example to a tolerance of 0.001 foot (or 1 millimeter). The ranging device 29 can then be activated to determine the distance between the ranging device 29 and the predetermined point on the plate 52. This value can then be added to the value of the distance of the predetermined point on the plate 52 to the light curtain 33 so as to obtain an exact measurement of the distance of the light curtain 33 from the ranging device 29, that is from the launch means 11. The calibration system 28 is then removed from the frame 10 and moved to the next ballistic screen 28 to carry out similar measurements. Alternatively, the calibration system may be mounted on an intermediate piece 16 of the frame 10 so as to be rolled or slid along the intermediate piece 16 to the next adjacent ballistic screen 13.

Typically, the inclined ballistic screens 13 are fixedly secured between a pair of vertical ballistic screens 13 so that the position of the angularly inclined curtain of light is known relative to the vertical curtains of light 33. Alternatively, the calibration system 28 may be used to determine the position of an inclined curtain of light at a particular elevation as well as the angle of inclination of the ballistic screens 13.

The calibration system 28 may also be moved vertically along the height of the frame 10, for example by being mounted on a vertical post 14. In this way, the calibration system 28 can be used to determine the deviation, if any, of a curtain of light of a screen 13 from a true vertical plane. In this respect, the measurements effected by the calibration system 28 are referenced to a true horizontal plane and a true vertical plane.

The invention thus provides a calibration system of relatively simple construction which can be used to determine the exact position of a curtain of light formed by a ballistic screen whether the ballistic screen is vertical or inclined. By determining the exact position of the curtain of light, the velocity of a golf ball moving through a series of such ballistic screens can be more accurately determined. By determining the velocity of a driven ball, between the various curtains of light of the ballistic screens and by determining the height of the driven ball in dependence upon the point at which the ball passes through the curtains of light of the inclined ballistic screens, information can be obtained so that a suitable programming means can produce a trajectory model of the flight of the ball, for example on a display screen.

The calibration system may be readily used with any known type of ballistic screen and can be retro-fitted to a test range employing such ballistic screens in a relatively simple manner.

What is claimed is:

1. In a test range for determining the velocity of a golf ball in flight, said test range comprising a frame defining an elongated path;

launch means at one end of said frame for propelling a golf ball into and through said path;

at least one pair of spaced apart ballistic screens adjustably mounted on said frame longitudinally of said path, each said screen having means for forming a curtain of light transversely of said path for passage of a propelled golf ball therethrough and sensing means for emitting a pulse in response to passage of a propelled golf ball therethrough at high speed;

a calibration system mounted on said frame for establishing an exact position of said curtain of light of at least one of said screens relative to a point on said system; and a ranging device adjacent said launch means for measuring the distance from said launch means to said point on said calibration system as a measure of the distance of said curtain of light of said one screen from said launch means.

2. A test range as set forth in claim 1 wherein said calibration system calibrates the position of said curtain of light to one-thousandths of a foot.

3. A test range as set forth in claim 1 wherein said calibration system includes a model ball, a shaft mounting said model ball thereon and means for moving said shaft at high speed to propel said model ball through said respective curtain of light.

4. A test range as set forth in claim 3 wherein said calibration system includes a mounting plate mounting said shaft thereon and being mounted on said frame, a horizontally adjustable means for moving said mounting plate horizontally relative to said frame and a vertically adjustable means for moving said mounting plate vertically relative to said frame.

5. A test range as set forth in claim 1 wherein said launch means includes a pair of endless belts defining an elongated longitudinally disposed passage and being spaced apart along said passage a distance sufficient to engage a golf ball in said passage on opposite sides thereof and means for moving said belts at different rates of speed to impart a spin on a ball engaged therebetween prior to propelling the ball into said path defined by said frame.

6. A test range as set forth in claim 5 wherein said launch means includes means for moving said endless belts simultaneously relative to a horizontal plane to adjust an angle of inclination of a golf ball launched from said belts relative to said horizontal plane.

7. A test range as set forth in claim 1 wherein said means for forming a curtain of light includes a plurality of light emitting devices for establishing a curtain of light perpendicular to said path for passage of a launched golf ball therethrough and said sensing means includes a plurality of detectors, each detector being disposed opposite a respective light emitting device to receive emitted light therefrom and to emit a pulse in response to an interruption of emitted light thereon for a preset time as an indication of the passage of a high speed golf ball through said light curtain.

8. A test range as set forth in claim 7 which further comprises means connected to said detectors of each ballistic screen to receive said pulses therefrom and to determine the velocity of the golf ball in passing between said ballistic screens based on the distances between said curtains of light of said screens and the time intervals between said pulses.

9. A test range as set forth in claim 8 which further comprises a third ballistic screen on said frame for establishing an angularly disposed light curtain between said pair of ballistic screens for passage of a launched ball therethrough, said third ballistic screen having light emitting devices to establish a curtain of light and detectors to sense the passage of a golf ball through said angularly disposed light curtain as an indication of the height of the golf ball between said pair of ballistic screens.

10. A test range as set forth in claim 1 wherein said ranging device is a laser ranging device.

11. In a test range for determining the velocity of a ball in flight, said test range comprising a frame defining an elongated path;

launch means at one end of said frame for propelling a ball into and through said path;

a plurality of vertically disposed ballistic screens adjustably mounted on said frame along said path, each ballistic screen having means for forming a curtain of light across said path for passage of a propelled ball therethrough and sensing means for emitting a pulse in response to passage of a propelled ball therethrough at high speed;

a calibration system mounted on said frame for establishing an exact position of said curtain of light of each said ballistic screen relative to a point on said system; and a ranging device adjacent said launch means for measuring the distance from said launch means to said point on said calibration system as a measure of the distance of each curtain of light relative to said launch means.

12. A test range as set forth in claim 11 wherein said calibration means includes a model ball, a shaft mounting said model ball thereon and means for moving said shaft at high speed to propel said model ball through said respective curtain of light.

13. A test range as set forth in claim 12 wherein said calibration system includes a mounting plate for mounting on said frame and having said shaft mounted thereon, a horizontally adjustable means for moving said mounting plate horizontally relative to said frame and a vertically adjustable means for moving said mounting plate vertically relative to said frame.

14. A test range as set forth in claim 11 wherein said means for forming a curtain of light includes a plurality of light emitting devices for establishing a curtain of light perpendicular to said path for passage of a launched ball therethrough and said sensing means includes a plurality of detectors, each detector being disposed opposite a respective light emitting device to receive emitted light therefrom and to emit a pulse in response to an interruption of emitted light thereon for a preset time as an indication of the passage of a high speed ball through said light curtain.

15. A test range as set forth in claim 14 which further comprises a processor connected to said detectors of each ballistic screen to receive an emitted pulse therefrom and to calculate the velocity of a propelled ball between each pair of consecutively disposed ballistic screw.

16. A test range as set forth in claim 15 which further comprises a plurality of angularly disposed ballistic screens disposed in said frame along said path, each angularly disposed ballistic screen being positioned between a pair of said vertically disposed ballistic screens and having means for forming a curtain of light across said path for passage of a propelled ball therethrough and sensing means for emitting a pulse in response to passage of a propelled ball therethrough at high speed; said processor being connected to said sensing means of each angularly disposed ballistic screen to receive an emitted pulse therefrom and to calculate the height of a propelled ball passing therethrough.

17. In a calibration system for establishing the position of a curtain of light of a ballistic screen, the combination comprising a model ball;

a shaft mounting said ball on one end thereof; and means for moving said shaft at high speed to propel said model ball through a curtain of light of a ballistic screen, said speed being sufficient to simulate the speed of a driven golf ball.

18. A calibration system as set forth in claim 17 wherein said means includes a rotary solenoid articulated with an opposite end of said shaft from said model ball for reciprocating said shaft.

19. A calibration system as set forth in claim 17 which further comprises a mounting plate and a sleeve mounted on said plate and slidably receiving said shaft therein.

20. A calibration system as set forth in claim 19 which further comprises horizontally adjustable means for moving said plate horizontally and vertically adjustable means for moving said plate vertically.

* * * * *